April 26, 1932. C. L. SNYDER 1,855,695
AIRCRAFT
Filed Sept. 8, 1930
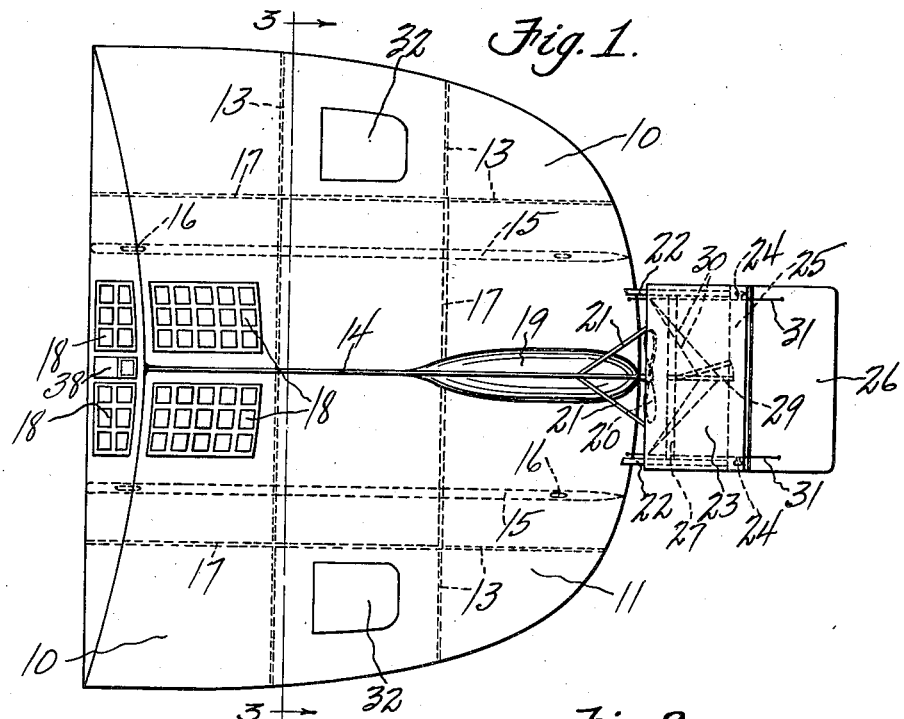
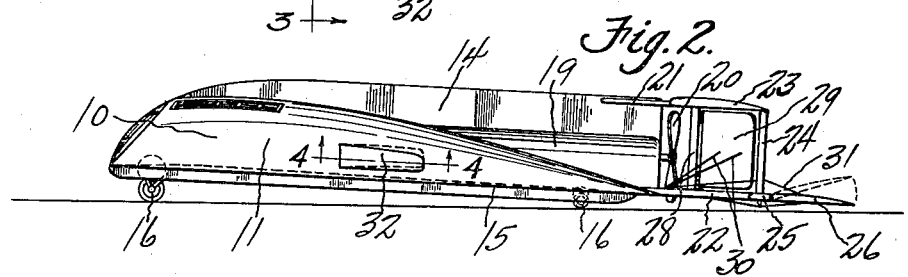
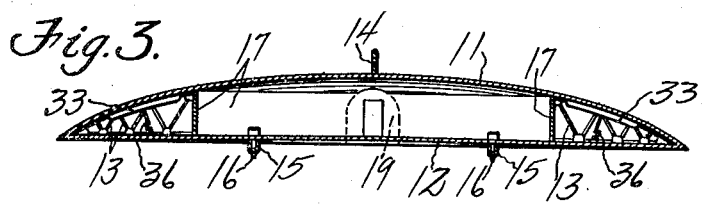
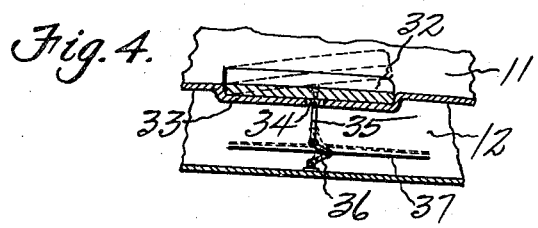
INVENTOR.
Cloyd L. Snyder.
BY
ATTORNEY.

Patented Apr. 26, 1932

1,855,695

UNITED STATES PATENT OFFICE

CLOYD L. SNYDER, OF SOUTH BEND, INDIANA, ASSIGNOR TO SNYDER HOLDING COMPANY, OF SOUTH BEND, INDIANA

AIRCRAFT

Application filed September 8, 1930. Serial No. 480,433.

The invention relates to aircraft, and more particularly to aircraft of the heavier-than-air type, and has for its primary object to provide a device of this character in which a stream-lined body having airfoil surfaces adapted to react with the air through which it passes to sustain the body in flight is employed and replaces the wings and fuselage of conventional aircraft.

A further object is to provide an aircraft having a body of this character which carries flight controlling means and in which compartments are provided to accommodate passengers, controls, motors, freight and the like.

A further object is to provide a device of this character having a body which is adapted to be adequately and securely braced from within whereby parasitic resistance to flight is reduced to a minimum, said body being formed whereby said internal bracing is readily accessible for inspection and repair.

A further object is to provide a device of this character having a stream-lined body in the airfoil surfaces of which are mounted lateral balancing members, said balancing members being received in recesses in the body to normally form a part of the airfoil surface of the body and being shiftable to interrupt the airfoil surface at either side thereof to control the lateral balance of the body.

A further object is to provide a device of this character whose body is provided with means for maintaining it in its desired line of flight and which carries the rudder, elevator and ailerons of the device.

With the above and other objects in view, the invention resides in the combination and arrangement of parts as hereinafter set forth, shown in the drawings, described and claimed it being understood that changes in the precise embodiment of the invention may be made within the scope of what is claimed without departing from the spirit of the invention.

In the drawings:

Figure 1 is a top plan view of the aircraft.

Figure 2 is a view of the aircraft in side elevation.

Figure 3 is a transverse vertical sectional view of the body of the aircraft taken on line 3—3 of Figure 1.

Figure 4 is a fragmentary vertical sectional view of the body of the aircraft taken on line 4—4 of Figure 2.

Referring to the drawings, which illustrate the preferred embodiment of the invention, the numeral 10 designates the body of the aircraft which is preferably formed with an upper or roof member 11 and a lower or floor member 12, said members being preferably formed of a light weight metal having suitable structural characteristics and strength, such as aluminum. The roof and floor members 11 and 12 preferably converge at their outer edges, and the floor member 12 is slightly inwardly dished at a point adjacent the forward or leading edge thereof, said member tapering regularly from said dished point to the outer edges thereof. The roof member 11 is of convex or dome-like formation with its greatest convexity or height adjacent the leading edge of the body and on the longitudinal center line of the body so that it substantially coincides with the dished point of the floor member, and the roof member tapers in a natural curve from said point of greatest height to the outer ends of the leading edge of the body, and every point on said curve is the highest point of the body on a longitudinal line passing therethrough. The roof member is curved in a short-radius curve from the leading edge to the curve of greatest height thereof and thence tapers to the side and rear edges thereof in a long natural curve. The leading edge of the body is preferably straight and the side edges of the body project rearwardly from the ends thereof in the shape of a parabola, the body in top or bottom elevation thus having the shape of a closed parabola. The body, as shown, is of substantially the same length and width, although said relative dimensions may be changed as conditions warrant and may in part be determined with relation to the height or convexity of the roof member. A series of trusses 13 positioned at spaced points in the body and extending longitudinally and transversely thereof support and brace the upper and lower body members 11 and 12 to hold them in their proper shape and in correct position with relation to each other. Partitions 17 dividing the body into compartments also serve to support the body and preferably coincide with said trusses to provide the greatest possible area of open space in the body. The body constructed as described is stream-lined throughout, and the roof and floor members per se form effective airfoil surfaces which react with the air through which the body passes to sustain it in flight, the roof member providing an upper airfoil surface which produces a suction or lifting effect, and the floor member being of a shape to provide a substantial air-cushion or supporting effect at the under side thereof. Thus this construction of the body provides a unitary airfoil member and body and replaces and eliminates the use of wings projecting from a body, this construction thus being a wingless aircraft and is of great strength and eliminates the great difficulties now encountered of supporting wings extending from the fuselage to permit them to sustain the stresses to which said wings are subjected. The compartments of the body formed by the partitions may separate the body as desired, for instance to provide a separate control compartment, passenger compartment, motor compartment, freight and fuel compartment, and the like.

A fin 14 extending centrally longitudinally of the body is mounted on the roof member 11, and fins 15 depend from the floor member 12 and extend longitudinally thereof in spaced relation. The lower fins are preferably formed to receive the wheels 16 of the craft which are mounted therein to project therefrom, said wheels preferably being constructed whereby they may be retracted into said fins when the craft is in flight whereby to minimize the resistance of the air to the flight of the body. Windows 18 are provided in the roof and floor members 11 and 12 of the body which permit vision in all directions from within the body of the craft, and a suitable door 38 is provided at the front of the body by which said body may be entered.

Integrally formed with and projecting from the upper body member 11 at the rear central portion thereof is a stream-lined motor housing 19 which is preferably accessible from the interior of the body and which housing contains a suitable motor whose shaft projects from the housing and carries a propeller 20 of the pusher type. Upper struts 21 carried by and projecting from the upper fin 14, and lower struts 22 projecting from the body 10, project rearwardly of the body at opposite sides of and spaced from the propeller. The upper struts 21 carry a stabilizer 23 which is supported at its rear by vertical struts 24 which in turn are carried by the leading edge portion 25 of the elevator 26 which is carried by the lower struts 22. Carried by the stabilizer 23 and a bar 27 extending between the lower struts 22 is a vertical rudder bar 28 positioned directly rearwardly of the propeller 20, said rudder bar carrying the rudder 29. Suitable controls 30 and 31 extend from the rudder and elevator, respectively, to the interior of the body, and serve to control said rudder and elevator.

Mounted in recesses 33 in the upper body member 11 of the body 10 at the center of balance of the craft and at points spaced equally distant from the side edges thereof are ailerons 32 which normally form a part of the upper airfoil surface. The recess 33 in which each aileron is mounted is just large enough to receive the aileron therein with a close fit so that there will be no cavities in the upper airfoil surface to break the effective surface thereof when the aileron is in normal seated position. The ailerons are hinged at their forward ends, and are provided with a suitable operating means positioned within the body 10 as illustrated in Figure 4. Hingedly depending from the center of the aileron through aperture 34 formed in the recess 33 of the roof of the body is a bar 35, said bar having a hinged connection with a toggle joint 36 carried by the floor of the body. A suitable operating member 37 is connected to the center of the toggle joint 26 and extends forwardly and rearwardly therefrom whereby the joint may be operated to raise or lower the aileron to break or maintain the airfoil surface and thus control the lateral balance of the craft.

The aircraft constructed in this manner has many advantages over conventional aircraft which employ wings and fuselage. The trusses 13 and partitions 17 mounted in the interior of the body adequately and securely support and reinforce the body from within whereby the parasitic resistance of the struts, wires, etc., employed by conventional aircraft are eliminated, and furthermore they are of a type which permits a construction of craft less liable to structural failure, and easier of access for repair while in flight, than conventional bracing members. The accessibility of the motor from the interior of the craft is a marked advantage and an aid to safety of flight, as is also the shape of the body which permits most of the controls to be mounted therein and provides a large amount of storage room for fuel tanks or freight, thus simplifying the fuel problem on long flights. The fins 14 and 15 form suitable means governing the direction of the flight of the craft and compensate for the elimination of the longitudinal fuselage lines. It will also be seen that the spread of the craft constructed in this manner will be much less than the spread of a craft of conventional construction, which greatly facilitates its handling on the ground and permits it to be quartered in comparatively small hangars.

Obviously the various parts of the craft may be altered from those of the type and construction shown. Thus the specific shape of the body might be altered and a body of another shape and construction which has airfoil surfaces adapted to react with the air to sustain the body in flight, and which eliminates the use of wings and fuselage, may be employed in place of the body shown. It will also be understood that puller instead of pusher propellers may be employed, and that as many may be used as is found necessary. The body may also be made in any desired size, from a single passenger craft to one which will accommodate as many passengers as found to be practicable, and the number and placement of the motors and propellers will be determined by the size of the craft. It will also be understood that changes may be made in the type, size, shape and location of the various other parts of the craft as may be found necessary or desirable to best carry out their function in the device.

A still further modification of the device might be made by providing complementary containers disposed in balanced relation in the body and preferably about its periphery to which helium or other gas might be supplied to increase the buoyancy of the body and thereby to convert it into an aircraft having characteristics of both the lighter-than-air and heavier-than-air craft.

The invention having been set forth, what is claimed as new and useful is:

1. An aircraft having a passenger carrying body of substantially equal length and breadth and having a substantially straight leading edge and a curved trailing edge, means for propelling said body, and means carried by said body controlling the direction of flight and the lateral and longitudinal balance thereof, said body comprising a roof member, a floor member, internal means supporting said roof and floor members, and partitions dividing said body into compartments, said roof and floor members being formed to provide upper and lower airfoil surfaces which react with the air through which the body passes to sustain it in flight.

2. In an airplane, a body of substantially equal length and breadth having a substantially straight leading edge and a curved trailing edge, means for propelling said body, and means controlling the flight of said body, said body being constructed as a unit and comprising upper and lower enclosing members shaped to form continuous cooperating airfoil surfaces throughout, which react with the air to form the sole means supporting the airplane in flight and in landing and ascending.

3. In an airplane, a body having compartments therein and having a substantially straight leading edge and a curved trailing edge, means propelling said body, and means controlling the flight of said body, said body comprising a convex upper enclosing member and a substantially plane lower enclosing member, each of substantially equal length and breadth, the breadth of said body imparting lateral stability thereto and the length of said body providing for a substantial convexity of said upper enclosing member to accommodate compartments therein without breaking the effective airfoil surface thereof.

4. In an aircraft, a body, means for propelling said body, means controlling the flight of said body, said body being constructed as a unit and comprising upper and lower enclosing members of substantially equal length and breadth, each having a substantially straight leading edge and sides curving therefrom in substantially the shape of a parabola, said upper enclosing member being cambered and the lower enclosing member being substantially plane, whereby said body has an airfoil shape on all longitudinal sections and will react with the air through which it passes to sustain the aircraft in flight.

5. In an aircraft, a body adapted to react with the air through which it passes to sustain the aircraft in flight, means for propelling said body, and means controlling the flight of said body, said body being constructed as a unit and comprising upper and lower enclosing members of substantially equal length and breadth each having a substantially straight leading edge and continuous side and trailing edges having substantially the shape of a parabola, said upper enclosing member being cambered with its greatest height adjacent the leading edge on all longitudinal sections thereof and having a substantially arcuate shape on all transverse sections thereof, and said lower enclosing member being substantially plane.

6. In an aircraft, a body adapted to react with the air through which it passes to sustain it in flight, means for propelling said body, and means controlling the flight of said body, said body comprising a fabricated unitary, structural frame of substantially equal length and breadth and having a substantially straight leading edge and a curved trailing edge, and upper and lower skin members carried by and enclosing said frame, said body having a cambered upper surface with its greatest convexity adjacent the leading edge and a substantially plane under surface.

7. In an aircraft, an airfoil body adapted to react with the air through which it passes to sustain the aircraft in flight, said body being of substantially equal length and breadth and having a substantially straight leading edge and a curved trailing edge, means propelling said body, means controlling the flight of said body, and vertical fins projecting from the upper and lower surfaces of said body and extending longitudinally of said body to maintain the direction of flight of said body.

8. In an aircraft, an airfoil body adapted to react with the air through which it passes to sustain the aircraft in flight, said body being of substantially equal length and breadth and having a substantially straight leading edge and a curved trailing edge, means propelling said body, means controlling the flight of said body, and vertical fins projecting from the upper and lower surfaces of said body and extending longitudinally of said body to maintain the direction of flight of said body, and landing gear carried by and retractible into said lower fins.

9. In an aircraft, an airfoil body adapted to react with the air through which it passes to sustain the aircraft in flight, said body being of substantially equal length and breadth and having a substantially straight leading edge and a curved trailing edge, means propelling said body, means controlling the flight of said body, and a stabilizer carried by said body at the rear thereof and in spaced relation to and above said body.

10. In an aircraft, an airfoil body adapted to react with the air through which it passes to sustain the aircraft in flight, said body being of substantially equal length and breadth and having a substantially straight leading edge and a curved trailing edge, means propelling said body, means controlling the flight of said body, vertical fins projecting from the upper and lower surfaces of said body and extending longitudinally of said body to maintain the direction of flight of said body, and a stabilizer carried by said body at the rear thereof in spaced relation to and above said body.

11. In an aircraft, a compartment body having an airfoil shape on all longitudinal sections and adapted to react with the air to form the sole means sustaining the aircraft in flight, means propelling said body, and means controlling the flight of said body, said body comprising a convex upper enclosing member and a substantially plane lower enclosing member, and having a straight leading edge and a curved trailing edge extending rearwardly from the ends of said leading edge, the curved trailing edge of said body and the convexity of said upper enclosing member providing a suction lift on said upper enclosing member at all transverse points thereof and spaced from the leading edge at each point in proportion to the length of the body at that point, said body being of a longitudinal dimension whereby the convexity of the upper enclosing member will be sufficient to provide a compartment in the body while maintaining an effective airfoil shape.

12. In an aircraft, a compartment body having an airfoil shape on all longitudinal sections and adapted to react with the air to sustain the body in flight, means propelling said body, means controlling the flight of said body, said body comprising a convex upper enclosing member and a substantially plane lower enclosing member, and having a substantially straight leading edge and a curved trailing edge extending rearwardly from the ends of said leading edge, the curved trailing edge of said body and the convexity of said upper enclosing member providing a suction lift on said upper enclosing member at all transverse points thereof and spaced from the leading edge at each point in proportion to the length of the body at that point, said body being of a longitudinal dimension whereby the convexity of the upper enclosing member will be sufficient to provide a compartment in the body while maintaining an effective airfoil shape, and gas containers mounted in said body and containing a lighter-than-air gas adapted to lighten the dead weight of the aircraft.

In testimony whereof I affix my signature.

CLOYD L. SNYDER.